(12) United States Patent
Siebler et al.

(10) Patent No.: US 9,658,904 B2
(45) Date of Patent: May 23, 2017

(54) METHODS AND SYSTEMS FOR INTER PLUG-IN COMMUNICATION (71) Applicant: NETAPP, INC., Sunnyvale, CA (US)

(72) Inventors: Clemens Veit Siebler, Munich (DE); Keith Tenzer, Munich (DE); Charles M. Fouts, Apex, NC (US)

(73) Assignee: NETAPP, INC., Sunnyvale, CA (US)

( * ) Notice: Subject to any disclaimer, the term of this patent is extended or adjusted under 35 U.S.C. 154(b) by 395 days.

(21) Appl. No.: 14/326,320

(22) Filed: Jul. 8, 2014

(65) Prior Publication Data
US 2016/0012128 A1 Jan. 14, 2016

(51) Int. Cl.
G06F 17/30 (2006.01)
G06F 9/54 (2006.01)

(52) U.S. Cl.
CPC .................... G06F 9/545 (2013.01)

(58) Field of Classification Search
None
See application file for complete search history.

(56) References Cited

U.S. PATENT DOCUMENTS

| 8,255,545 B1* | 8/2012 | Schmidt | H04L 67/1095 709/227 |
| 2011/0184913 A1* | 7/2011 | Hayden | G06F 11/2097 707/652 |
| 2012/0047483 A1* | 2/2012 | Amit | G06F 17/30861 717/104 |
| 2012/0192055 A1* | 7/2012 | Antebi | G06F 17/30206 715/229 |
| 2014/0081901 A1* | 3/2014 | Szymczak | G06F 9/44526 707/601 |

* cited by examiner

Primary Examiner — Carol Choi
(74) Attorney, Agent, or Firm — Klein, O'Neill & Singh, LLP (57) ABSTRACT Methods and system for a storage environment are provided. The method generates a first discovery request for a first plug-in associated with a first application executed by a computing system having access to a networked storage system for a storage service operation; acquires metadata by the first plug-in for the storage service operation and storing the metadata at a first location and at a second location, where the second location is at a storage device managed by a storage interface module that co-ordinates completion of the storage service operation; generates a second discovery request for a second plug-in for a second application for the storage service operation; and acquires metadata by the second plug-in using the metadata acquired by the first plug-in for the storage service operation and updating metadata stored at the first location and the second location.

21 Claims, 9 Drawing Sheets

METHODS AND SYSTEMS FOR INTER PLUG-IN COMMUNICATION

TECHNICAL FIELD

The present disclosure relates to inter plug-in communication for storage service related operations.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in the cloud based and virtual environments where a physical resource is time-shared among a plurality of independently operating processor executable virtual machines. Typically, storage space is presented to a virtual machine as a virtual hard disk (VHD) file. A storage drive (for example, C:\) is then presented to a user via a user interface within a virtual machine context. The user can use the storage drive to access storage space to read and write information.

Storage related services are provided for replicating and restoring applications and virtual machines. Plug-in based frameworks are being developed for providing such services, especially in the cloud based environment. Typically, multiple plug-in are used to collect information that is needed for storage service related operations. Continuous efforts are being made for developing methods and systems for enabling efficient communication between plug-ins.

SUMMARY

In one aspect, a machine implemented method is provided. The method includes generating a first discovery request for a first plug-associated with a first application executed by a computing system having access to a networked storage system for a storage service operation; acquiring metadata by the first plug-in for the storage service operation and storing the metadata at a first location and at a second location, where the second location is at a storage device managed by a storage interface module that co-ordinates completion of the storage service operation; generating a second discovery request for a second plug-in for a second application for the storage service operation; acquiring metadata by the second plug-in for the storage service operation using the metadata acquired by the first plug-in and updating metadata stored at the first location and the second location; and using the updated metadata stored at the first location or the second location for completing the storage service operation based on where the first plug-in and the second plug-in application are executed.

In another aspect, a non-transitory, machine readable storage medium having stored thereon instructions for performing a method is provided. The machine executable code which when executed by at least one machine, causes the machine to: generate a first discovery request for a first plug-associated with a first application executed by a computing system having access to a networked storage system for a storage service operation; acquire metadata by the first plug-in for the storage service operation and storing the metadata at a first location and at a second location, where the second location is at a storage device managed by a storage interface module that co-ordinates completion of the storage service operation; generate a second discovery request for a second plug-in for a second application for the storage service operation; acquire metadata by the second plug-in for the storage service operation using the metadata acquired by the first plug-in and update metadata stored at the first location and the second location; and use the updated metadata stored at the first location or the second location for completing the storage service operation based on where the first plug-in and the second plug-in application are executed.

In yet another aspect, a system is provided. The system includes a memory having machine readable medium with machine executable code having instructions stored thereon. The system also includes a processor module coupled to the memory configured to execute the machine executable code to: generate a first discovery request for a first plug-associated with a first application executed by a computing system having access to a networked storage system for a storage service operation; acquire metadata by the first plug-in for the storage service operation and storing the metadata at a first location and at a second location, where the second location is at a storage device managed by a storage interface module that co-ordinates completion of the storage service operation; generate a second discovery request for a second plug-in for a second application for the storage service operation; acquire metadata by the second plug-in for the storage service operation using the metadata acquired by the first plug-in and update metadata stored at the first location and the second location; and use the updated metadata stored at the first location or the second location for completing the storage service operation based on where the first plug-in and the second plug-in application are executed.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1A:
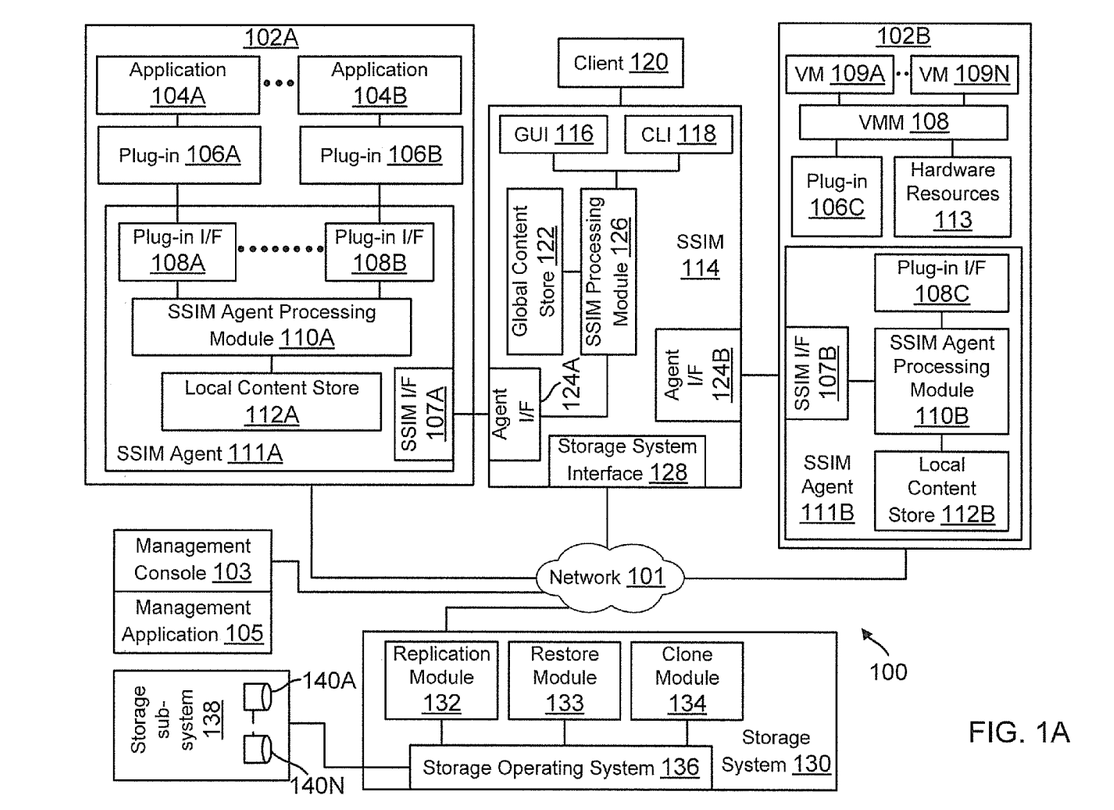
FIG. 1A shows an example of an operating environment for the various aspects disclosed herein.

System 100:

FIG. 1A shows an example of a system 100, where the various adaptive aspects disclosed herein can be implemented. In one aspect, system 100 may include a plurality of computing systems 102A-102B (may also be referred to individually as a host system/platform 102 or server 102) communicably coupled to a storage system 130 executing a storage operating system 136 via a connection system (network) 101 such as a local area network (LAN), wide area network (WAN), the Internet and others. As described herein, the term "communicably coupled" may refer to a direct connection, a network connection, or other connections to enable communication between devices.

Host system 102A may execute a plurality of processor executable applications 104A-104B. The applications may be for different functionality, for example, application 104A may be a database management system, and application 104B may be a host based application that can map database data containers to storage elements, for example, a volume or virtual disks, as described below in detail. Each application is assigned a plug-in 106A (may also be referred to as a first plug-in) and 106B (may also be referred to as a second plug-in), respectively, that is executed within or interfaces with a storage service interface module (SSIM) agent (or simply "agent") 111A/111B, described below in detail. The plug-ins are provided for performing certain discovery functions for enabling certain storage services related operations, described below in detail.

As an example, plug-ins 106A/106B may be Java (without derogation of any trademark rights) based plug-ins. The plug-ins use a platform independent, token-based authentication system for sharing information between each other.

Host system 102A executes agent 111A that interfaces with or includes plug-ins 106A and 106B and with SSIM 114 that is described below in more detail. Agent 111A includes a central processing module 110A that interfaces with each plug-in through a plug-in interface 108A/108B. Agent processing module 110A also maintains a local context store 112A that is used to store metadata discovered by the plug-ins as described below in detail. Metadata at the local context store 112A may be stored as a "Key-Value pair". This allows the plug-ins to store information in a format independent manner making it easier to store and access information.

Host system 102B is similar to host system 102A but may be used to execute a virtual machine environment where a physical resource is time-shared among a plurality of independently operating processor executable virtual machines (VMs) 109A-109N. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources" 113. The host hardware resources 113 may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one aspect, host system 102B includes or interfaces with a virtual machine monitor (VMM) 108, for example, a processor executed Hyper-V layer provided by Microsoft Corporation of Redmond, Wash., a hypervisor layer provided by VMWare Inc. (without derogation of any trademark rights), or any other type. The terms Hyper-V and hypervisor are used interchangeably throughout this specification. VMM 108 presents and manages the plurality of guest OS for the VMs 109A-109N. The VMM 108 may include or interface with a virtualization interface layer (VIL) (not shown) that provides one or more virtualized hardware resource to each guest OS.

It is noteworthy that in some instances, a virtualization environment may include one or more hypervisors, used independently or through a hypervisor aggregator. The generic virtualization environment described above with respect to FIG. 1A may be customized to implement the various aspects of the present disclosure. The various aspects of the present disclosure are not limited to any specific virtualization environment. Furthermore, VMM 108 may execute other modules, for example, a storage driver, network interface and others, the details of which are not germane to the aspects described herein and hence have not been described in detail.

In one aspect, VMM 106 is executed by host system 102B with VMs 109A-109N. In another aspect, VMM 108 may be executed by an independent stand-alone computing system, often referred to as a hypervisor server or VMM server and VMs 109A-109N are presented at one or more computing systems.

VMM 108 interfaces with a plug-in 106C (may also be referred to as a third plug plug-in) that is similar to plug-ins 106A/106B but is used to perform discovery related to VMs 109A-109N and storage presented to the VMs, as described below in detail. Host system 102B also executes agent 111B that includes a plug-interface 108C and an agent processing module 110B similar to agent processing module 110A. A local context store 112B is also maintained by the agent 111B, similar to local context store 112A.

Host systems 102A/102B interface with the storage system 108 via network 101. Storage system 130 has access to a set of mass storage devices 140A-140N (may be referred to as storage devices 140) within at least one storage subsystem 138. The storage devices 140 managed by the storage operating system 136 are used to store data containers (for example, files, objects, structured and unstructured data) for various VMs and applications. The mass storage devices 140 may include writable storage device media such as magnetic disks, video tape, optical, DVD, magnetic tape, non-volatile memory devices for example, self-encrypting drives, flash memory devices and any other similar media adapted to store information. The storage devices 140 may be organized as one or more groups of Redundant Array of Independent (or Inexpensive) Disks (RAID). The various aspects disclosed are not limited to any particular storage device type or storage device configuration.

In one aspect, the storage system 130 provides storage volumes (also interchangeably referred to as volumes) to applications and clients. A set of storage volumes may be referred to as a logical storage pool. The term storage volume or volume as used herein means a logical data set which is an abstraction of physical storage, combining one or more physical mass storage devices or parts thereof into a single logical storage object (including a logical unit number (LUN)). A storage volume whose size can be varied is referred to as a flexible storage volume (or "FlexVol"). A qtree or any sub-volume unit may also be created within a storage volume, for example, a directory qtree or any other object based storage location. As a special case, a qtree may be an entire storage volume.

Each storage volume may be configured to store data files (or data containers or data objects), scripts, word processing documents, executable programs, and any other type of structured or unstructured data. Each storage volume can represent the storage space in one storage device, an aggregate of some or all of the storage space in multiple storage devices, a RAID group, or any other set of storage space.

The storage operating system 136 may be used to store and manage information at storage devices 140 based on a client request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP), or Fibre Channel over Ethernet (FCoE).

In a typical mode of operation, a client (application or VM) transmits one or more input/output (I/O) commands, such as a CFS or NFS request, over connection system 101 to the storage system 130. Storage operating system 136 receives the request, issues one or more I/O commands to storage devices 140 to read or write the data on behalf of the client system, and issues a CIFS or NFS response containing the requested data over the network 101 to the respective client system.

Storage system 130 may include or interface with a replication module 132 that is used to take a point in time copy (may also be referred to as a snapshot) of a volume. A restore module 133 is used to restore a volume. A cloning module 134 may be used to clone a LUN. The replication module 132, restore module 133 and cloning module 134 interface with SSIM 114 that is provided to co-ordinate and manage storage services for a plurality of applications executed by a plurality of computing systems 102A-102B.

SSIM 114 includes agent interface 124A and 124B to communicate with agents 111A and 111B, respectively. The structure and format of interface 124A and 124B will depend on the protocol used by the agents and SSIM 114 for communication.

SSIM 126 also includes a processing module 126 that maintains a global context store 122. The information stored at the global context store 122 is used to synchronize the information from the local context stores 112A/112B as described below. The information at the global context store 122 is used for performing storage service related operations, for example, backup and restore operations.

SSIM 114 also includes a GUI module 116 and a command line interface (CLI) module 118 for presenting an interface to a client computing system 120. The GUI and/or CLI are presented for receiving storage services related requests, for example, to replicate, restore and/or clone a storage volume. It is noteworthy that client 120 may communicate with SSIM 114 either directly or via a network connection. The various aspects disclosed herein are not limited to any specific connection mechanism.

System 100 may also include a management console 103 that executes a processor executable management application 105 for managing and configuring various elements of system 100. Application 105 may be used to manage and configure storage and other resources that are used by applications and VMs, according to one aspect.

The plug-in based architecture described above is suitable for providing cloud based storage and storage services described below with respect to FIG. 2B. SSIM 114 provides a replication and restore framework using the various plug-ins to provide storage capabilities for various applications and VMM 108. To backup information, the various plug-ins need to communicate efficiently.

As an example, assume that plug-in 106B is a host plug-in for a client application (104B). Plug-in 106A is a database plug-in for a database application 104A that runs on a VM presented by VMM 108. If one were to back-up a database used by the VM, then database plug-in 106A has to discover its database files, host plug-in 106B has to map the files to virtual disks and plug-in 106C has to map virtual disks or objects to physical or logical storage. If multiple VMs or applications are to be efficiently replicated, then the various the plug-ins should communicate effectively as described below in detail.

Figure 1B:
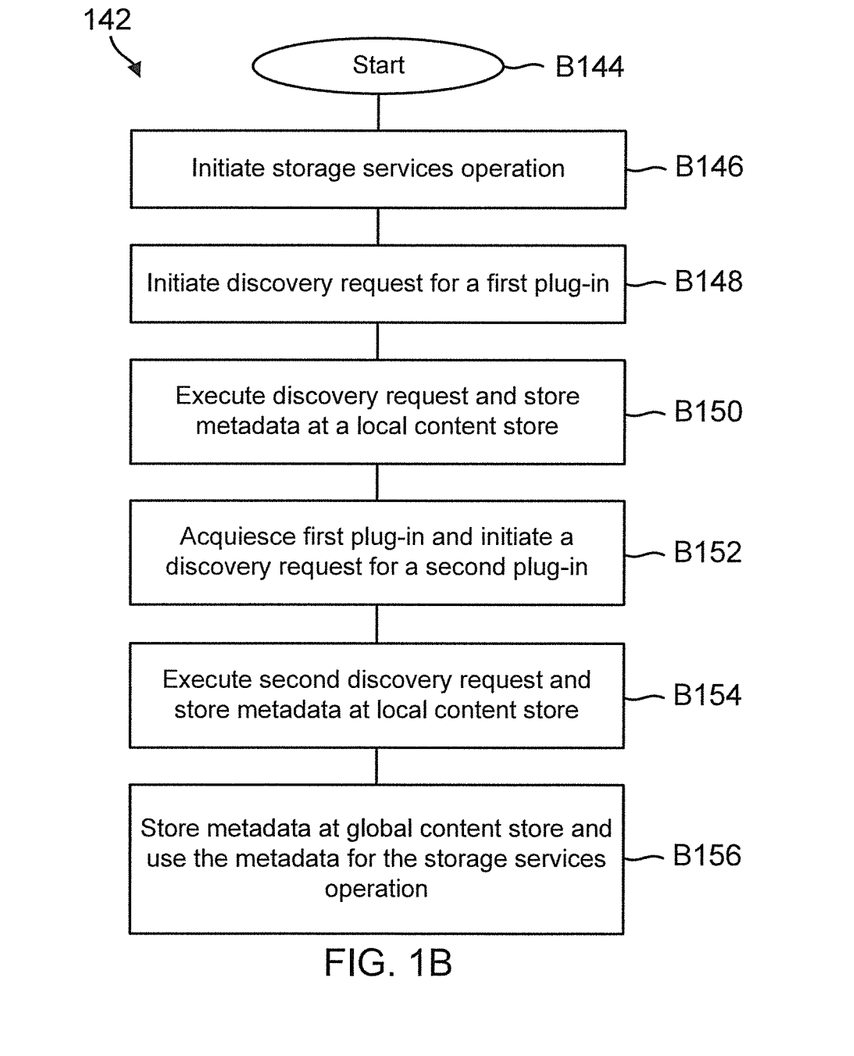
FIGS. 1B-1D show various process flows, according to various aspects of the present disclosure.

Process Flow:

FIG. 1B shows a process 142 where a plurality of plug-ins communicate using the local context store 112A, according to one aspect. As an example, the process 142 is described with respect to host system 102A of FIG. 1A. Process 142 begins in block B144, when host 102A is initialized and operation. Application 104A operates as database application and stores various database files at a storage device using a storage volume. A storage services operation is initialized in block B146. The storage services operation may be to replicate or restore a database or portion thereof. The request may be received from the client 120 using SSIM 114.

In response to the request, a discovery request is initiated for a first plug-in, for example, 106A. The discovery request is generated by the processing module 126 of SSIM 114. The request is communicated to agent 111A via agent interface 124A and then provided to the plug-in 106A via the plug-in interface 108A. Based on the discovery request, in block B150, plug-in 106A conducts a discovery of all the database files that may have to be replicated. Plug-in 106A is customized and understands the layout and behavior of application 104A. Plug-in 106A communicates with application 104A to obtain information regarding the database that is to be replicated or restored. The metadata associated with various database files are stored at the local context store 112A. In one aspect, the local context store stores Key-Value pairs, for example, [list of files, database name], [file location information] and configuration information for the database.

In block B152, the first application 104A is placed in a state that files cannot be changed i.e. quiesced. A discovery request for the second plug-in 106B is initiated by SSIM 114. The second discovery request is executed by the plug-in 106B. Plug-in 106B accesses the local context store 112A and obtains the list of files and location information that were discovered by plug-in 106A. Plug-in 106B then obtains the volume information where the files are stored and the identity of the storage system that manages the volume (s). The second plug-in 106B is a host plug-in that is aware of how and where information is stored with respect to storage elements (for example, storage volumes). The local context store 112A is then updated by the second plug-in 106B. In one aspect, the second plug-in 106B also stores Key-Value pairs to store the volume information. For example, local context store 112A stores the name of database container files and the storage volumes where the files are stored. The Key-Value pairs also store the storage path for the database files.

Thereafter, in block B156, the stored information is shared with SSIM 114 for the storage services operation. SSIM 114 can use the Key-Value pairs to obtain the file names, volume identifiers and the storage paths. SSIM 114 can then issue a replication or restore request to the storage system 136 for performing the storage services related operation.

Figure 1C:
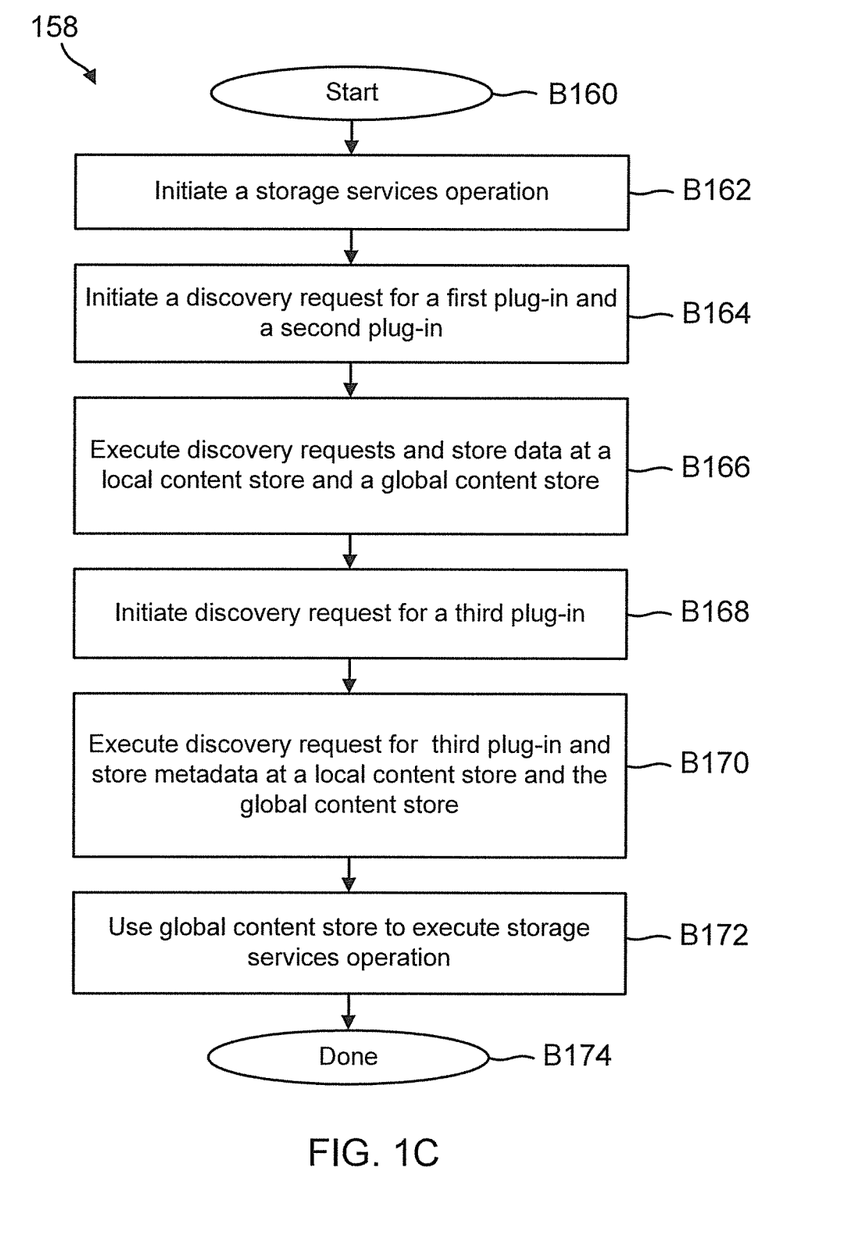

FIG. 1C shows a process 158 for using the global context store 122, according to one aspect. Process 158 is described with respect to FIG. 1A and using plug-ins 106A-106C. The process begins in block B160, when host 102A and 102B are operational. Application 104A in this context may be executed within a VM having access to virtual storage. A storage services operation, for example, a backup operation or a restore operation is initiated in block B162.

In block B164, a discovery request is initiated for a first plug-in 104A and a second plug-in 104B. In block 8166, the first plug-in 104A and the second plug-in 104B execute the discovery requests, as described above with respect to blocks B152 and B152 (FIG. 1B), except that plug-in 106B associates the files discovered by plug-in 106A with virtual disks. The metadata collected by the plug-ins are stored in the local context store 112A and the global context store 122.

In block B168, a discovery request is initiated for the third plug-in 106C that is executed by a different host system 102B. The third plug-in 106C obtains information regarding the relationship of the virtual disks with storage at storage devices 140 for the storage volumes determined by the second plug-in 106B. The metadata collected by the third plug-in 106C is first stored at local context store 112B and then at the global context store 122. As described above, the metadata may be stored as Key-Value pairs identifying virtual disks and storage volume values that store the database containers.

In block B172, SSIM 114 uses the updated information from the global context store 122 to execute the storage services operation. SSIM 114 uses the Key-Value pairs to obtain the database containers, storage volume information and the virtual storage disk information. The information is then communicated to the storage system 136 for performing the storage services operation. The process then ends in block B174.

Figure 1D:
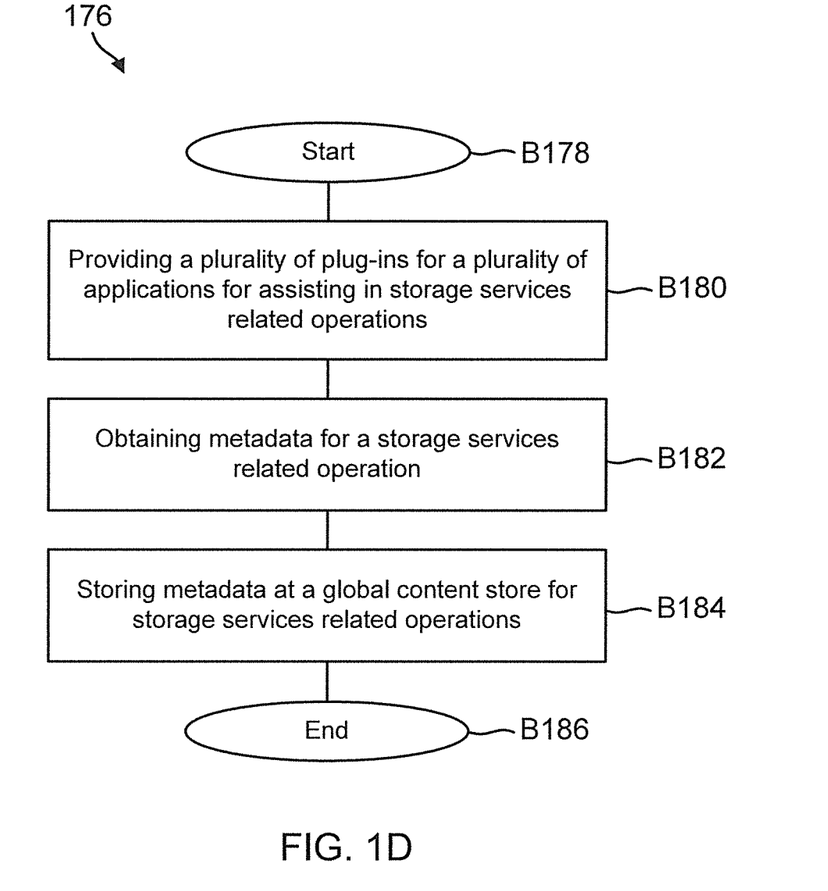

FIG. 1D shows a process 176 for managing communication between a plurality of plug-ins, according to one aspect. The process begins in block B178, where SSIM 114 is provided for storage services. In block B180, a plurality of plug-ins (106A-106C) is provided for a plurality of applications, for example, 104A, 104B and VMM 108, respectively. When a storage service operation is requested, the plug-ins collect metadata for the operation. For example, plug-in 106A collects application specific file information, while plug-in 106B associates the files to storage elements, for example, virtual disks. Plug-in 106C uses the discovered data from plug-in 106B and collects data that associates the virtual disks to physical or logical volumes.

In block B184, the metadata is stored at local and global context stores, such that SSIM 114 can use the metadata for one or more storage services operation, for example, backup, restore and cloning. The process then ends in block B186.

Figure 2A:
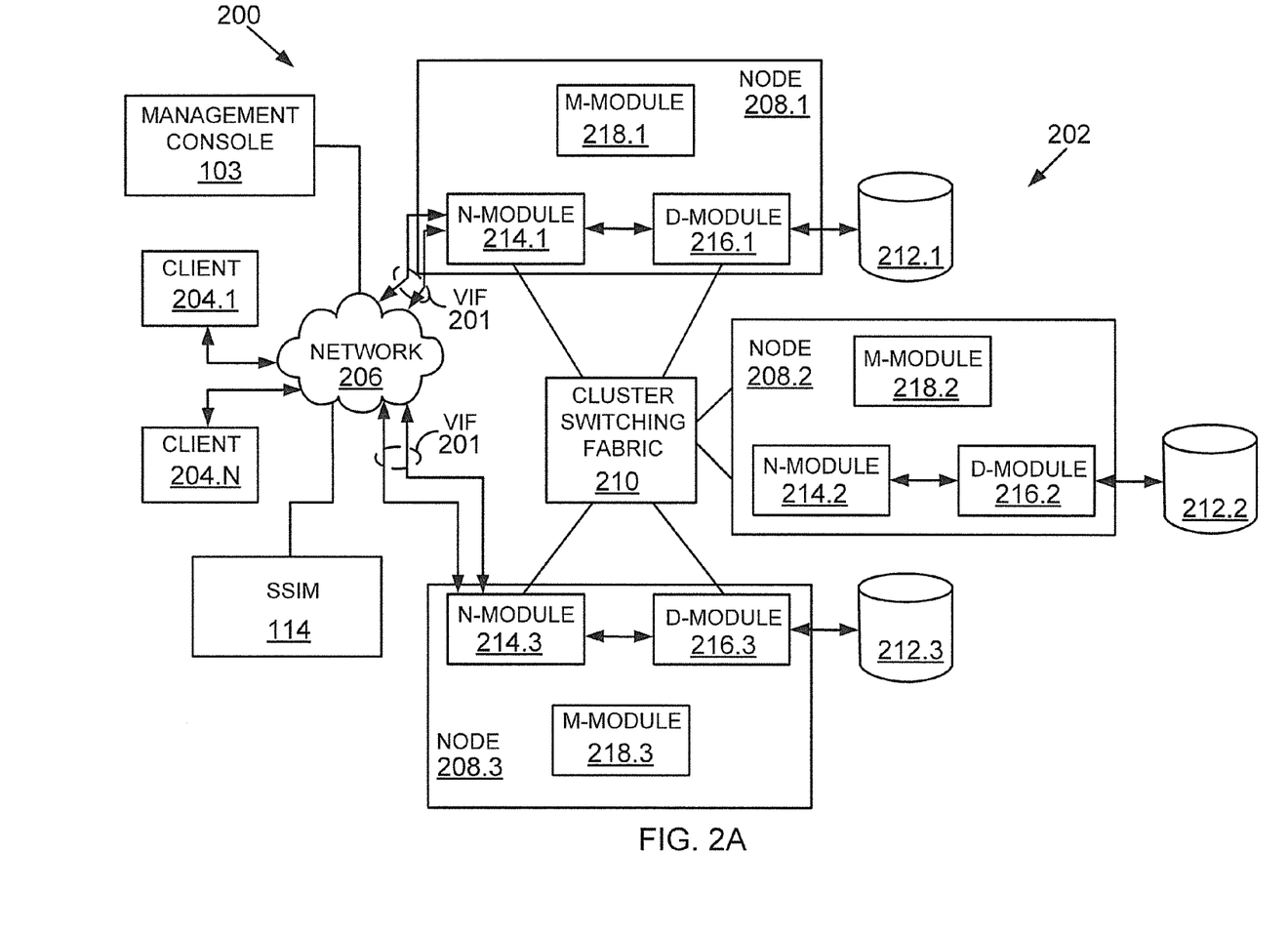
FIG. 2A shows an example of a clustered storage system, according to one aspect of the present disclosure.

Clustered System:

FIG. 2A shows a cluster based storage environment 200 having a plurality of nodes for managing storage devices, according to one aspect. SSIM 114 interfaces with various nodes in the storage environment 200 for providing storage related services described above with respect to FIGS. 1A-1D, according to one aspect.

Storage environment 200 may include a plurality of client systems 204.1-204.N (or virtual machines 109A-109N), a clustered storage system 202 (similar to storage system 130), management console 103 and at least a network 206 communicably connecting the client systems 204.1-204.N and the clustered storage system 202. As shown in FIG. 2A, the clustered storage system 202 includes a plurality of nodes 208.1-208.3, a cluster switching fabric 210, and a plurality of mass storage devices 212.1-212.3 (may be referred to as 212 and similar to storage device 140).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N (or SSIM 114) over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 may be used to implement the replication module 132, restore module 133 and clone module 134.

A switched virtualization layer including a plurality of virtual interfaces (VIFs) 201 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

Each client system 204.1-204.N (or VM 109A-109N) may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
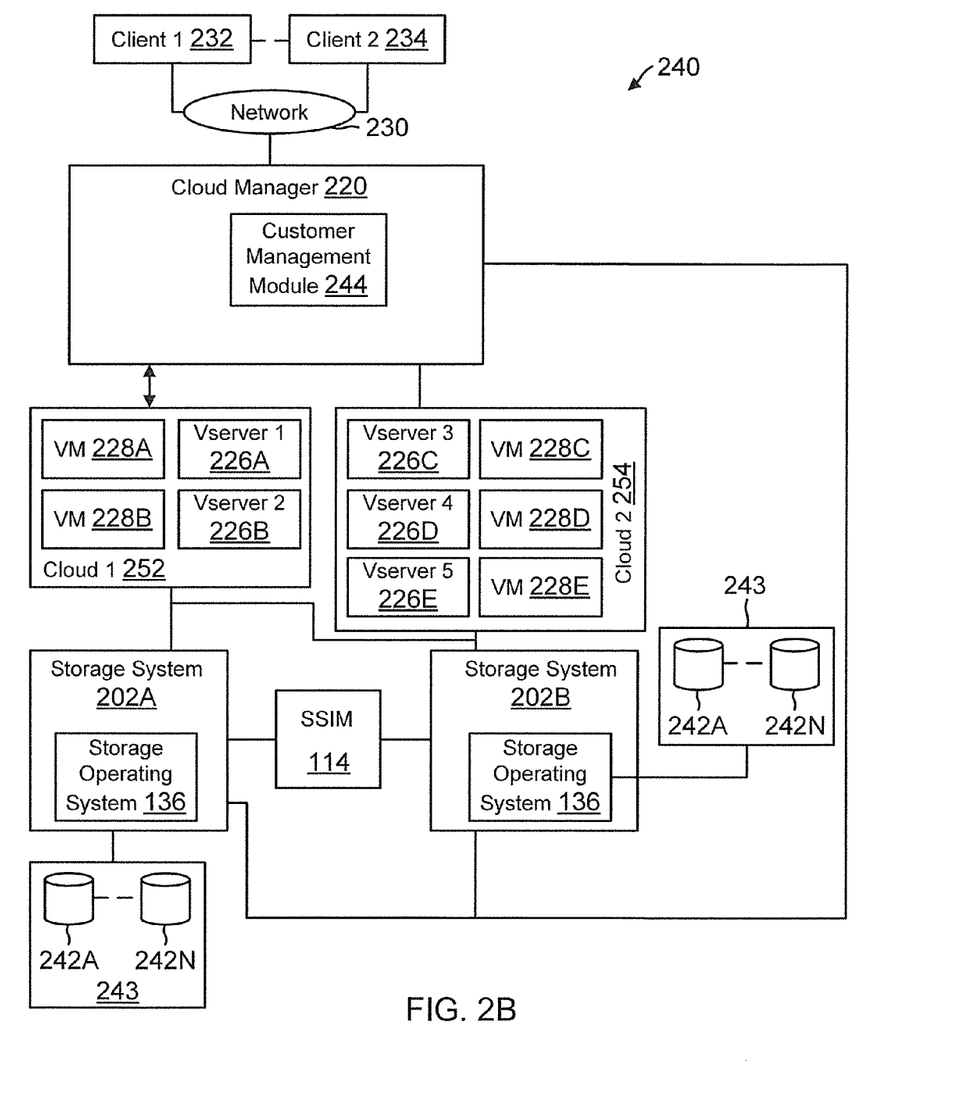
FIG. 2B shows an example of using a cloud based environment, according to aspect of the present disclosure

Cloud Computing Environment:

FIG. 2B shows one or more storage system 202A/202B analogous to storage system 130/202 in a cloud computing environment 240, according to one or more aspects. The plug-in architecture of FIG. 1A can be used in cloud environment 240 for providing storage services.

In one or more aspects, cloud computing environment 240 may be a computing environment configured to enable network access (e.g., on-demand) to a shared pool of configurable computing resources (e.g., networks, storage, host servers, applications, services). In one or more aspects, a storage system may be a hardware resource configured to host one or more vservers in cloud computing environment 240.

Storage system 202A and storage system 202B may be deployed by a cloud manager 220 and/or a cloud administrator configured to provision the host systems, storage associated with one or more client devices (e.g., client 1 232, client 2 234) and/or services requested by the one or more client devices. As an example, storage system 202A may be configured to be associated with vserver 1 226A and vserver 3 226C. Storage system 202B may be configured to be associated with vserver 2 226B, vserver 4 226D and vserver 5 226E.

In one or more aspects, cloud manager 220 may enable one or more client devices to self-provision computing resources thereof. As an example, cloud manager 220 may manage cloud portion(s) (e.g., cloud 1 252, cloud 2 254) associated with client 1 232 and client 2 234. Client 1 232 and/or client 2 234 may log into a console associated with cloud manager 220 to access cloud 1 252 and/or cloud 2 254 (and the VMs 228A-228E therein) through a public network 230 (e.g., Internet). The client devices and/or VMs associated therewith provided in cloud computing environment 240 may be analogous to the clients of FIGS. 1A/2A.

In order to address storage requirements/requests associated with client 1 232 and client 2 234, cloud manager 220 may be configured to appropriately provision vserver 1 226A, vserver 2 226B, vserver 3 226C, vserver 4 226D and vserver 5 226E and allocate to client 1 232 and client 2 234. The aforementioned vservers may be virtualized entities utilized by client 1 232 and client 2 234 to meet storage requirements thereof. Multi-tenancy may allow for a storage system to have multiple vservers associated therewith. A portion of the cloud (e.g., cloud 1 252) including vserver 1 226A, vserver 2 226B and VMs (e.g. VM 228A, VM 228B) associated therewith may be associated with client 1 232 and a portion of the cloud (e.g., cloud 2 254) including vserver 3 226C, vserver 4 226D and vserver 5 226E and VMs (e.g., VM 228C, VM 228D, VM 228E) associated therewith may be associated with client 2 234. In one or more aspects, VMs may reside on storage exposed by vserver(s).

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232 and/or client 2 234 may be entities (e.g., corporations, departments and others), and that there may be a number of computing devices associated with each of client 1 232 and/or client 2 234.

Cloud 1 252 and/or cloud 2 254 may span across several geographic regions. In one or more aspects, the aforementioned cloud portions may span multiple countries under differing jurisdictional guidelines. For example, a jurisdictional guideline may deem that a vserver needs to be launched on hardware (e.g., storage system) located in the same jurisdiction as the corresponding client(s).

In one or more aspects, administrators of cloud computing environment 240 may possess the authority to launch one or more vservers on any of storage system, irrespective of the location(s) thereof. Further, in one or more aspects, the aforementioned one or more vservers may be associated with one or more versions of storage operating system 136. For example, an administrator may modify the version of the storage operating system and/or configuration settings on storage system 202A and/or storage system 202B.

Figure 3:
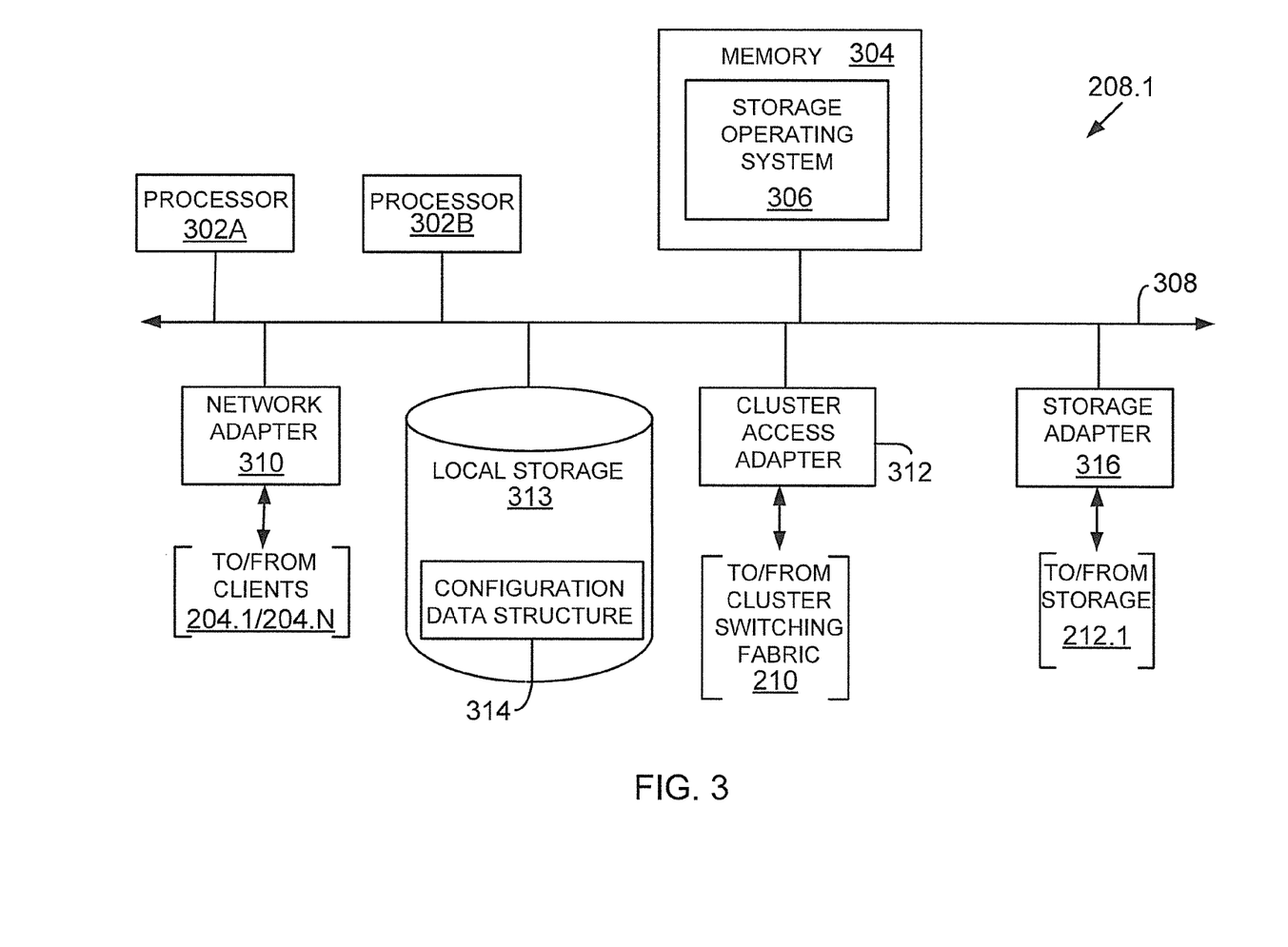
FIG. 3 shows an example of a storage system node, according to one aspect of the present disclosure.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 202.

Each node 208.1 is illustratively embodied as a dual processor storage system executing a storage operating system 306 (similar to 136, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
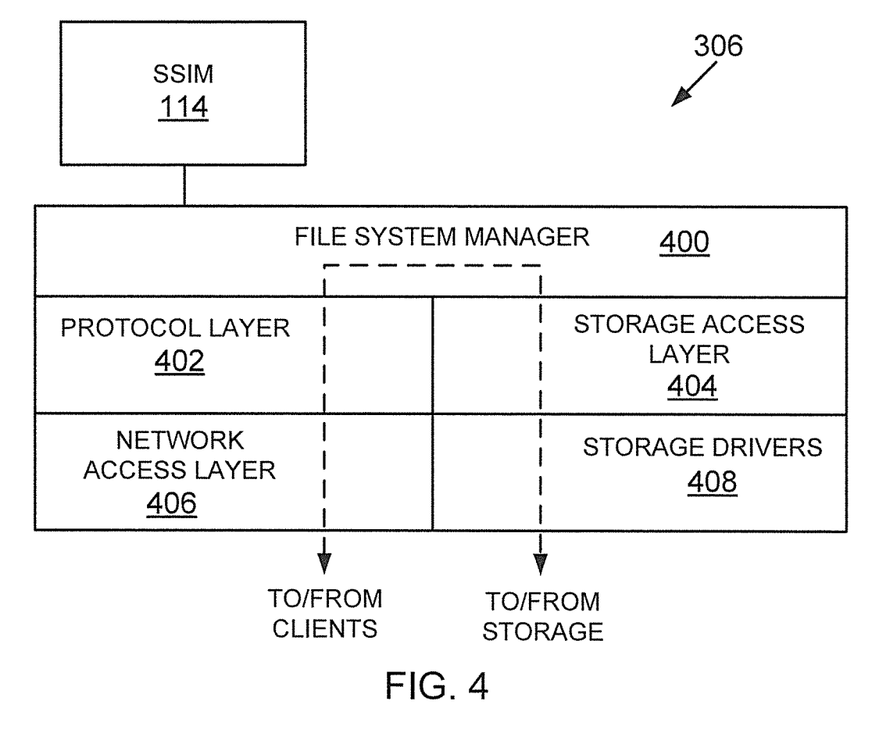
FIG. 4 shows an example of a storage operating system, used according to one aspect of the present disclosure.

Operating System:

FIG. 4 illustrates a generic example of storage operating system 306 (or 136, FIG. 1A) executed by node 208.1, according to one aspect of the present disclosure. The storage operating system 306 interfaces with SSIM 114 for executing storage services related operations, as described above.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' and mass storage devices 212.1-212.3 (or 140) are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
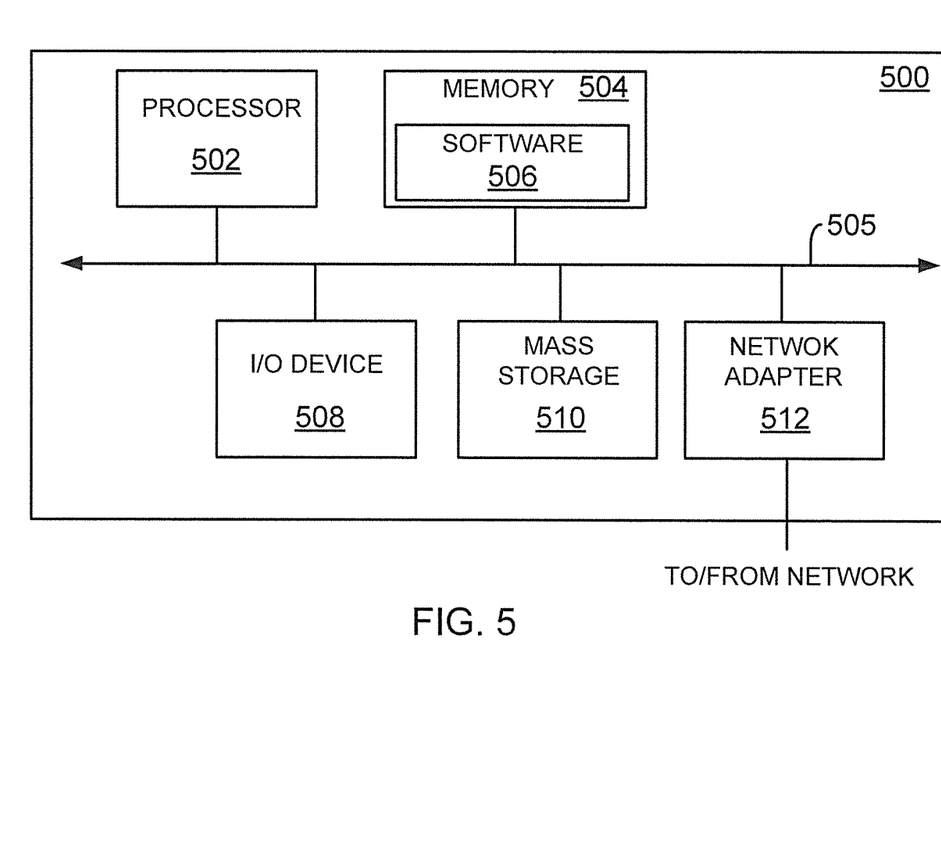
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent SSIM 114, management console 103, host system 102A/102B, client 120/204 or storage system 130.

Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above with respect to FIGS. 1B-1D may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, methods and apparatus for inter-plug-in communication have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
generating a first discovery request for a first plug-in associated with a first application executed by a first computing system having access to a networked storage system for executing a storage service operation including at least one or more of a backup, cloning and restore operation for data managed by the first application; wherein the first plug-in is customized for the first application that performs a first function associated with the data managed by the first application;
acquiring metadata by the first plug-in for the storage service operation and storing the metadata at a first location and at a second location, where the second location is at a storage device remote to the first computing system managed by a storage interface module that co-ordinates completion of the storage service operation; wherein the metadata acquired by the first plug-in identifies the data for the storage service operation and provides location information of where the data is stored;
acquiescing the first application to prevent any change to the data for the storage service operation;
generating a second discovery request for a second plug-in for a second application for the storage service operation; wherein the second plug-in is customized for the second application that performs a second function different from the first function and associated with a storage system used for storing the data for the first application;
acquiring additional metadata by the second plug-in for the storage service operation using the metadata acquired by the first plug-in and updating the metadata stored at the first location and the second location by the additional metadata; wherein the additional metadata identifies a storage volume where the data is stored and an identity of the storage system that manages the storage volume;
selecting the updated metadata that includes metadata acquired by the first plug-in and the additional metadata acquired by the second plug-in from the first location when the first plug-in and the second plug-in application are executed by the first computing system;
selecting the updated metadata that includes metadata acquired by the first plug-in and the additional metadata acquired by the second plug-in from the second location when the first plug-in and the second plug-in application are executed by different computing systems; and
completing the storage service operation using the selected updated metadata.

2. The method of claim 1, wherein a discovery request is initiated for a third plug-in associated with a third application to update the additional metadata acquired by the second plug-in.

3. The method of claim 2, wherein the third plug-in obtains information regarding a relationship between a virtual disk and the storage volume identified by the additional metadata and stores the updated additional metadata at the first location and the second location.

4. The method of claim 1, wherein the first application is a database application and the first plug-in obtains database data container information for the storage service operation and the second plug-in maps database containers to storage elements.

5. The method of claim 2, wherein the first application is a database application that obtains database data container information for the storage service operation and the third plug-in associates a storage element for the database data container with a virtual storage element.

6. The method of claim 1, wherein metadata at the first location and the second location are stored as key-value pairs, where a first key-value pair identifies a data container, a second key-value pair associates the data container with a virtual storage element and a third key-value pair associates the virtual storage element with a physical or logical storage element.

7. The method of claim 2, wherein the third application and the third plug-in are executed by a second computing system.

8. A non-transitory, machine readable storage medium having stored thereon instructions for performing a method, comprising machine executable code which when executed by at least one machine, causes the machine to:
generate a first discovery request for a first plug-associated with a first application executed by a first computing system having access to a networked storage system for executing a storage service operation including at least one or more of a backup, cloning and restore operation for data managed by the first application; wherein the first plug-in is customized for the first application that performs a first function associated with the data managed by the first application;
acquire metadata by the first plug-in for the storage service operation and storing the metadata at a first location and at a second location, where the second location is at a storage device remote to the first computing system managed by a storage interface module that co-ordinates completion of the storage service operation; wherein the metadata acquired by the first plug-in identifies the data for the storage service operation and provides location information of where the data is stored;
acquiesce the first application to prevent any change to the data for the storage service operation;
generate a second discovery request for a second plug-in for a second application for the storage service operation; wherein the second plug-in is customized for the second application that performs a second function different from the first function and associated with a storage system used for storing the data for the first application;
acquire additional metadata by the second plug-in for the storage service operation using the metadata acquired by the first plug-in and updating the metadata stored at the first location and the second location by the additional metadata; wherein the additional metadata identifies a storage volume where the data is stored and an identity of the storage system that manages the storage volume;
select the updated metadata that includes metadata acquired by the first plug-in and the additional metadata acquired by the second plug-in from the first location when the first plug-in and the second plug-in application are executed by the first computing system;
select the updated metadata that includes metadata acquired by the first plug-in and the additional metadata acquired by the second plug-in from the second location when the first plug-in and the second plug-in application are executed by different computing systems; and
complete the storage service operation using the selected updated metadata.

9. The storage medium of claim 8, wherein a discovery request is initiated for a third plug-in associated with a third application to update the additional metadata acquired by the second plug-in.

10. The storage medium of claim 9, wherein the third plug-in obtains information regarding a relationship between a virtual disk and the storage volume identified by the additional metadata and stores the updated additional metadata at the first location and the second location.

11. The storage medium of claim 8, wherein the first application is a database application and the first plug-in obtains database data container information for the storage service operation and the second plug-in maps database containers to storage elements.

12. The storage medium of claim 9, wherein the first application is a database application that obtains database data container information for the storage service operation and the third plug-in associates a storage element for the database data container with a virtual storage element.

13. The storage medium of claim 8, wherein metadata at the first location and the second location are stored as key-value pairs, where a first key-value pair identifies a data container, a second key-value pair associates the data container with a virtual storage element and a third key-value pair associates the virtual storage element with a physical or logical storage element.

14. The storage medium of claim 9, wherein the third application and the third plug-in are executed by a second computing system.

15. A system, comprising:
a memory having machine readable medium comprising machine executable code having instructions stored thereon; and a processor module coupled to the memory configured to execute the machine executable code to:
generate a first discovery request for a first plug-associated with a first application executed by a first computing system having access to a networked storage system for executing a storage service operation including at least one or more of a backup, cloning and restore operation for data managed by the first application; wherein the first plug-in is customized for the first application that performs a first function associated with the data managed by the first application;
acquire metadata by the first plug-in for the storage service operation and storing the metadata at a first location and at a second location, where the second location is at a storage device remote to the first computing system managed by a storage interface module that co-ordinates completion of the storage service operation; wherein the metadata acquired by the first plug-in identifies the data for the storage service operation and provides location information of where the data is stored;
acquiesce the first application to prevent any change to the data for the storage service operation;
generate a second discovery request for a second plug-in for a second application for the storage service operation; wherein the second plug-in is customized for the second application that performs a second function different from the first function and associated with a storage system used for storing the data for the first application;
acquire additional metadata by the second plug-in for the storage service operation using the metadata acquired by the first plug-in and updating the metadata stored at the first location and the second location by the additional metadata; wherein the additional metadata identifies a storage volume where the data is stored and an identity of the storage system that manages the storage volume;

select the updated metadata that includes metadata acquired by the first plug-in and the additional metadata acquired by the second plug-in from the first location when the first plug-in and the second plug-in application are executed by the first computing system;

select the updated metadata that includes metadata acquired by the first plug-in and the additional metadata acquired by the second plug-in from the second location when the first plug-in and the second plug-in application are executed by different computing systems; and complete the storage service operation using the selected updated metadata.

16. The system of claim 15, wherein a discovery request is initiated for a third plug-in associated with a third application to update the additional metadata acquired by the second plug-in.

17. The system of claim 16, wherein the third plug-in obtains information regarding a relationship between a virtual disk and the storage volume identified by the additional metadata and stores the updated additional metadata at the first location and the second location.

18. The system of claim 15, wherein the first application is a database application and the first plug-in obtains database data container information for the storage service operation and the second plug-in maps database containers to storage elements.

19. The system of claim 15, wherein the first application is a database application that obtains database data container information for the storage service operation and the second plug-in associates a storage element for the database data container with a physical or logical storage element.

20. The system of claim 15, wherein metadata at the first location and the second location are stored as key-value pairs, where a first key-value pair identifies a data container, a second key-value pair associates the data container with a storage element and a third key-value pair associates the virtual storage element with a physical or logical storage element.

21. The system of claim 16, wherein the third application and the third plug-in are executed by a second computing system.

* * * * *